United States Patent [19]

Mazur et al.

[11] 4,302,290

[45] Nov. 24, 1981

[54] NUCLEAR REACTOR VESSEL HEAD EQUIPMENT SUPPORT STRUCTURE

[75] Inventors: Joseph M. Mazur, Ludlow, Mass.; Donn M. Matteson, South Windsor, Conn.

[73] Assignee: Combustion Engineering, Inc., Windsor, Conn.

[21] Appl. No.: 108,621

[22] Filed: Dec. 31, 1979

[51] Int. Cl.³ .............................................. G21C 19/20
[52] U.S. Cl. ..................................... 376/287; 414/146; 307/147; 376/260; 376/347; 376/463
[58] Field of Search .................... 176/30, 87; 414/146; 294/86 A; 307/147

[56] References Cited

U.S. PATENT DOCUMENTS

| | | | |
|---|---|---|---|
| 3,583,892 | 6/1971 | Isaac | 176/30 |
| 3,942,031 | 3/1976 | Bander | 307/147 |
| 4,064,000 | 12/1977 | Andrea | 176/30 |

*Primary Examiner*—Donald P. Walsh
*Attorney, Agent, or Firm*—Arthur E. Fournier, Jr.

[57] ABSTRACT

A head equipment support structure system (HESS) (10) particularly adapted to be cooperatively associated with a nuclear reactor vessel (12) for purposes of effecting a separation of the electrical cables (30) that are utilized in the head area of such a vessel (12), as well as for purposes of providing support for these cables (30). The subject HESS (10) which is in the form of an integral structure that is removably supported relative to the vessel (12) combines the features of cable support structure, missile shield, and cooling ductwork support structure. The HESS (10) embodies horizontally disposed multiple decks (14) to which the cables (30) are vertically routed from the reactor vessel head. The decks (14), which are located in vertically spaced relation directly above the reactor vessel head, support and separate the cables (30). The decks (14) further function to align the corresponding ends of the cables (30) with their respective mating connectors, the latter being associated with the reactor vessel head and the connection panels suitably mounted on the surrounding wall surfaces. The cable decks (14) and steel plates formed integral with the HESS (10) are operative in the manner of a missile shield in that they function to absorb the energy of any missiles generated at the reactor vessel head. Lastly, other equipment (66, 68, 70, 72, 74) normally located in the head area is cooperatively associated with the HESS (10) in mounted relation thereto so as to be capable of being handled as a unit therewith during refueling operations, etc.

10 Claims, 4 Drawing Figures

NUCLEAR REACTOR VESSEL HEAD EQUIPMENT SUPPORT STRUCTURE

BACKGROUND OF THE INVENTION

This invention relates to structures of the type that are employable as a support for equipment, and, more particularly, to a head equipment support structure system that is designed to be cooperatively associated with a nuclear reactor vessel in a nuclear power generation system for purposes of accomplishing the support of equipment that is externally located in the head area of such a vessel.

One of the main operating components of any nuclear power generation system is the nuclear reactor. Commonly, the latter is suitably supported within a pressure vessel. Furthermore, it is within this vessel that the nuclear reaction takes place from which there is generated the energy that is utilized to produce the power that is provided by the nuclear power generation system.

In accord with established practice, the nuclear reactor vessel is in turn suitably housed within an appropriate form of containment structure, the latter commonly being made of concrete. For purposes of effectuating control over the operation of the nuclear reactor housed within the pressure vessel, there is a need to make use of various pieces of equipment. Some of these pieces are designed to be located internally of the vessel with means cooperatively associated therewith for effecting operation thereover from the exterior of the vessel, while others of these pieces are designed to be physically located externally of the vessel with means cooperable therewith extending into the vessel interior. In either case, however, all of the equipment is generally to be found located within the confines of the containment structure. Normally, in addition to such pieces of equipment, instrumentation is made use of for purposes of monitoring the activities taking place within the vessel. Thus, such instrumentation constitutes yet another form of means for which support must be provided in the immediate vicinity over the vessel. In summary, therefore, it should be readily apparent from the above that normally it is to be expected that there will be found a multiplicity of various pieces of equipment as well as various types of instrumentation extending outwardly from the vessel for which a need exists to provide support therefor.

Insofar as regards this matter of providing support for the aforementioned equipment and/or instrumentation, there are a number of factors that must be borne in mind in arriving at a decision as to the nature of the support that should be utilized. More specifically, reference is had here to the fact that consideration must be given to much more than merely a selection of simply any given one of the many commonplace forms of support means that have been known to have been used heretofore by the prior art. For example, there is a need to consider the nature of the environment in which the subject equipment and/or instrumentation is being employed, and the potential for deleterious effects that such an environment may have on the ability of a given form of support means to provide the support deemed to be required therefrom. Moreover, it is of prime importance that consideration be given to the matter of safety. In addition, with regard to all of the above, there is the still further need to take cognizance of the fact that there exists various rules and regulations that have been promulgated by governmental agencies relating to this subject. Lastly, because of relatively recent incidents that have occurred involving nuclear power generation systems, other steps have been suggested for implementation looking towards the effectuation of additional improvements in the practices and procedures that it is recommended be followed in the course of constructing and operating each of the many components normally thought of being encompassed within a conventionally constructed nuclear power generation system.

In order to effect the requisite degree of communication between the interior and the exterior of the nuclear reactor vessel for purposes of accomplishing the operation of the various pieces of equipment and instrumentation associated with the proper functioning of the nuclear reactor housed within and outside the reactor vessel, one of the means most frequently employed for this purpose is one form or another of cabling. The vast usage which is made of cabling in this regard creates the image of a virtual maze thereof within the confines of the containment structure directly over the reactor vessel. As such, there exists an obvious need to furnish some form of support therefor in order to provide effective separation therebetween for ease of ready identification thereof, etc. This need is further compounded by the fact that in many instances the use of redundant cabling is mandated by safety rules and/or regulations, or may be employed simply as a matter of prudent practice. Thus, there is a requirement for more than mere separation of such cabling. Namely, that cabling which may be viewed as constituting the primary set of cabling must be effectively isolated from the cabling which functions as a backup thereto such that the likelihood, that damage occasioned from the same source will be done concurrently to both the primary and the backup cabling, is very improbable. By way of further illustration of this point, sufficient separation and isolation of the backup cabling from the primary cabling should exist such that in the event that the latter is damaged, as for instance by fire, the probability that the backup cabling would suffer damage also from the same fire would be extremely remote.

Apart from the functional requirements enumerated above which should be satisfied by any support structure that is selected for use in association with the reactor vessel of a nuclear power generation system, there are other attributes which such a support structure should possess. For example, means must be provided to enable access to be had periodically to the interior of the containment structure for purposes of effecting repairs and/or the carrying out of normal maintenance on the equipment housed therewithin. This encompasses the need to replace or repair the aforementioned cabling. Consequently, access must obviously be available thereto. In addition, such cabling should be provided with suitable connection means at the termination points thereof so as to enable the cabling to be readily disconnected for purposes of effecting the replacement thereof, etc.

Moreover, besides the need to simply gain access to the interior of the containment structure, there also exists a need to periodically remove the head of the reactor vessel for purposes of exposing the interior thereof such as, for instance, to effectuate the performance of the refueling of the nuclear reactor. Accordingly, whatever form of support structure is selected for utilization within the containment structure for purposes of providing support for the pieces of equipment and/or instrumentation associated with the operation of the nuclear reactor must be suitably located or must embody the capability of being positioned so as to not impede the removal of the reactor vessel head. In this context, the support structure should be sufficiently movable to enable the removal of the head of the reactor vessel to be accomplished in an expeditious manner. A further complication in this regard, however, is the fact that a considerable amount of ductwork is to be found cooperatively associated with the reactor vessel, as well as a structure which is referred to by those skilled in this art as a missile shield. The existence of both this ductwork and the missile shield impose restrictions on the degree of accessibility that is afforded to the aforesaid support structure as well as function to limit the extent to which the subject support structure may be moved for purposes of effecting removal of the reactor vessel head.

Essentially, the function of the ductwork that has been referred to above is to afford a means of funneling to the reactor vessel the cooling required in the course of the conduct of the operation of the nuclear reactor housed within the reactor vessel. The missile shield, on the other hand, referred to above commonly takes the form of a concrete member. The function thereof is to form a barrier in the event that an incident should occur whereby members confined within the containment structure are given impetus such that they take on the characteristics of missiles. Thus, the concrete missile shield is designed under such circumstances to absorb the kinetic energy possessed by such missile-like members such as to cause them to slow down, i.e., loose their potential to cause damage within the interior of the containment structure and/or to escape from the containment structure whereby they would pose a danger to personnel and equipment located externally of the containment structure.

The need to periodically effect the refueling of the nuclear reactor housed within the reactor vessel has been alluded to hereinabove. With further regard thereto, it is important that this task be accomplished in a safe, yet timely fashion. Namely, it is important that the overall time required to perform the refueling operation be kept at a minimum inasmuch as during this period, the nuclear power generation system of which the nuclear reactor is a principal component is not producing power. Moreover, inasmuch as the nuclear reactor is housed within an environment which, if proper safeguards are not taken, can be hazardous to humans, it is important that the refueling operation be completed in a minimum of time. Accordingly, irrespective of what may occasion the need to shutdown the nuclear reactor, i.e., the need to refuel the latter, etc., it is important that the period during which a power outage occurs be kept to a minimum, both because of the effect that the power loss has on the customers of the power generation system as well as because of the desire to minimize the time during which the personnel working in the vicinity of the reactor are exposed to the potentially hazardous environment represented thereby. Thus, a further important consideration in selecting a support structure for use in cooperative association with the reactor vessel is that the structure which is selected for use should not have an adverse impact on the ability to effect a minimization of the time period during which the nuclear power generation system is in a non-power producing state. On the other hand, if further time-savings in this regard are achievable through the employment of a given support structure, this would enhance the desirability of making use of the latter.

Yet another consideration that should be borne in mind in the course of determining the nature of the support structure that will be selected for use in effecting the separation and support of the pieces of equipment, instrumentation and cabling utilized in connection with the operation of the nuclear reactor housed within the reactor vessel is the ability thereof to be employed in retrofit situations. Namely, it would be desirable to have provided a form of support structure that is usable not only in new installations, but also is equally applicable for use in existing installations for purposes of effecting improvements over the support structures that are presently to be found employed therein.

It is, therefore, an object of the present invention to provide a support structure system that is particularly suitable for use in cooperative relation with a reactor vessel in a nuclear power generation system for purposes of providing support for the head equipment associated therewith.

It is another object of the present invention to provide such a head equipment support structure system that is operable in the manner of a cable support structure.

It is still another object of the present invention to provide such a head equipment support structure system that, in addition, is operable in the manner of a missile shield.

A further object of the present invention is to provide such a head equipment support structure system that is also operable in the manner of a ductwork support structure.

A still further object of the present invention is to provide such a head equipment support structure system that is characterized in the ease with which it may be repositioned for purposes of effecting the removal of the head of the reactor vessel.

Yet another object of the present invention is to provide such a head equipment support structure that is equally applicable for use in new installations as well as retrofit applications.

Yet still another object of the present invention is to provide such a head equipment support structure system that renders it possible through the use thereof to attain measurable cost-savings and time-savings as compared to the costs and times associated with the use of prior art forms of support structure systems.

SUMMARY OF THE INVENTION

In accordance with the present invention there is provided a new and improved head equipment support structure system (HESS) that is particularly adapted to be cooperatively associated with the reactor vessel in a nuclear power generation system for purposes of functioning as a support for the head equipment that is operably connected therewith. The subject HESS is designed, when occupying the installed position thereof, to be physically located above and in spaced relation to the head of the reactor vessel. Moreover, when in this position the HESS is supported from structure which is located in surrounding relation to the reactor vessel. The HESS includes a multiplicity of spaced decks suitably interconnected so as to form an integral structure. In addition, the HESS includes a plurality of support columns extending substantially perpendicular to the multiple decks, and operable as support members for the HESS. The multiple decks are used for supporting and separating the electrical cabling that is to be found located in the head area of the vessel. This cabling is enclosed in flexible conduit and is routed from a position external of the reactor vessel through and onto the decks of the HESS, where the cabling is separated and support is provided thereto, for subsequent connection to other cabling located in supported relation on the surfaces of the walls that surround the reactor vessel. The decks of the HESS further function to afford missile protection, thus making of the HESS a missile shield, the latter being required to be emplaced over the head of the reactor vessel. In addition, the HESS has mounted thereto cooling ductwork employable for purposes of drawing air therethrough for effecting a cooling of equipment associated with the nuclear reactor housed within the reactor vessel. Lastly, the HESS is designed to be removable from the head of the reactor vessel as an integral structure.

DESCRIPTION OF A PREFERRED EMBODIMENT

Figure 1:
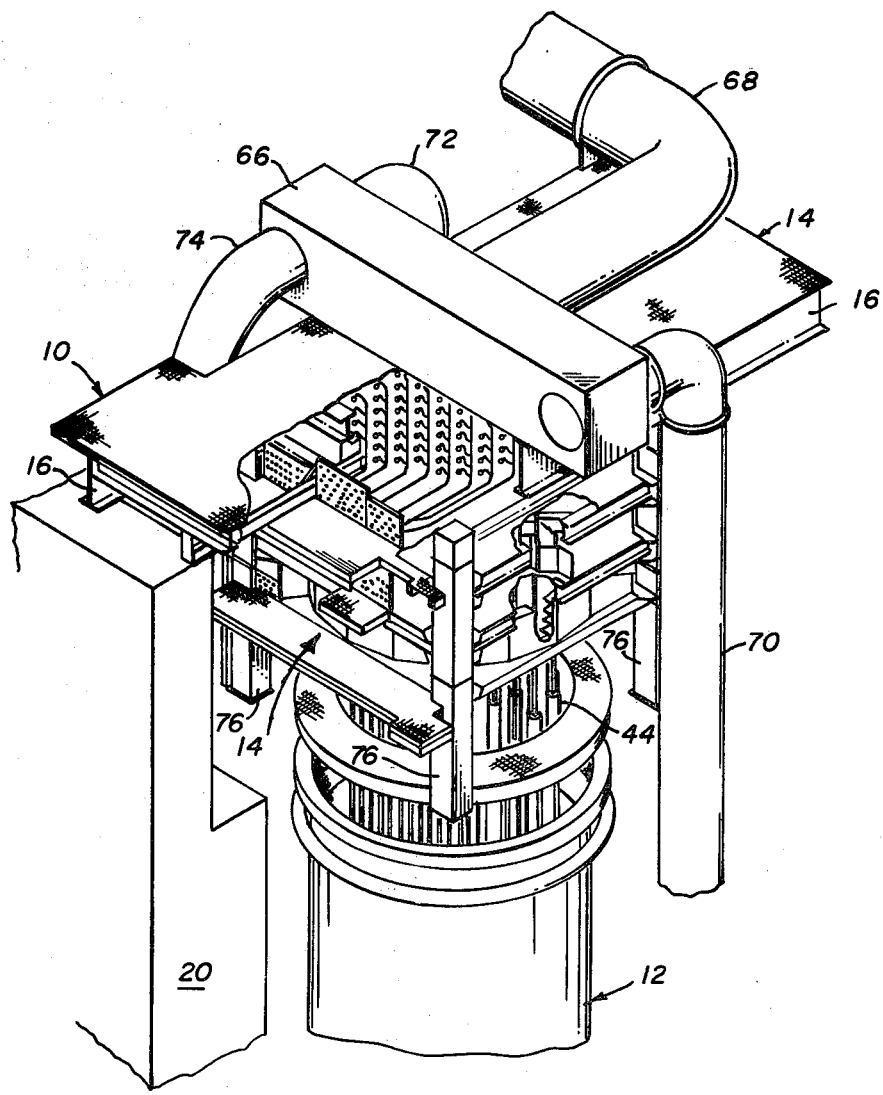
FIG. 1 is a perspective view, with some parts broken away, of a head equipment support structure system (HESS) constructed in accordance with the present invention, illustrated cooperatively associated with a reactor vessel of the type that is utilized in a nuclear power generation system of conventional construction for purposes of housing therewithin the nuclear reactor thereof.

Referring now to the drawing, and, more particularly, to FIG. 1 thereof, there is depicted therein a head equipment support structure system, hereinafter referred to by the acronym HESS, that is generally designated therein by reference numeral 10, and which embodies a construction in accordance with the present invention. In accord with the illustration of FIG. 1, the intent is to show therein the HESS 10 in cooperative association with a reactor vessel, and with the latter being generally designated in FIG. 1 through the use of the reference numeral 12. Within the latter reactor vessel 12 is housed the nuclear reactor (not shown) of a nuclear power generation system. Inasmuch as the manner in which the nuclear reactor (not shown) is housed within the reactor vessel 12 is well-known to those skilled in this art, it is not deemed necessary for purposes of acquiring an understanding of the present invention to set forth a description thereof herein, or to include illustrations thereof in the drawing. Likewise, the manner in which the reactor vessel 12 is operatively connected to the other components (not shown) which taken together collectively comprise a conventionally constructed nuclear power generation system is well-known to those skilled in the art. Accordingly, it is not deemed necessary to include a description thereof herein, or an illustration thereof in the drawing, particularly in view of the fact that it is only indirectly related to the subject matter of the present invention. However, should a description or illustration thereof be sought, reference may be had for this purpose to the teachings thereof that are readily available in the prior art.

With further reference to FIG. 1, as shown therein, the HESS 10, in a manner which will be described more fully hereinafter, is suitably supported relative to the reactor vessel 12 so as to be located directly above the latter and in spaced relation thereto, while yet still being positioned so as to be operatively connectable thereto. To this end, the HESS 10 is located so as to be capable of performing the following functions; namely, that of a cable support structure, that of a missile shield, and that of a ductwork support structure. More specifically, the HESS 10 is intended to be operative to effect the separation and support of the electrical cabling associated with the operation of the nuclear reactor (not shown) that is housed within the reactor vessel 12. As regards the matter of a missile shield, preselected segments of the internal structure of the HESS 10 are designed to be capable of absorbing the kinetic energy of any missiles that strike thereagainst, such as to be operative in the manner of a missile shield. Lastly, the ductwork that is needed for purposes of achieving the requisite cooling of certain equipment associated with the operation of the nuclear reactor (not shown) housed in the reactor vessel 12 is designed to be mountable in supported relation on the HESS 10.

Figure 2:
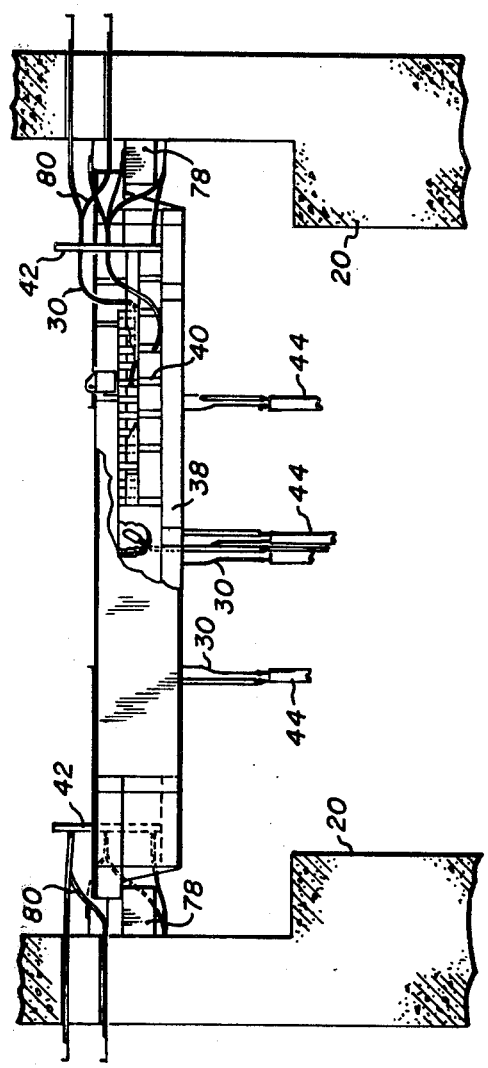
FIG. 2 is a side elevational view, with some parts broken away, of the lower deck portion of another form of a HESS constructed in accordance with the present invention.
Figure 3:
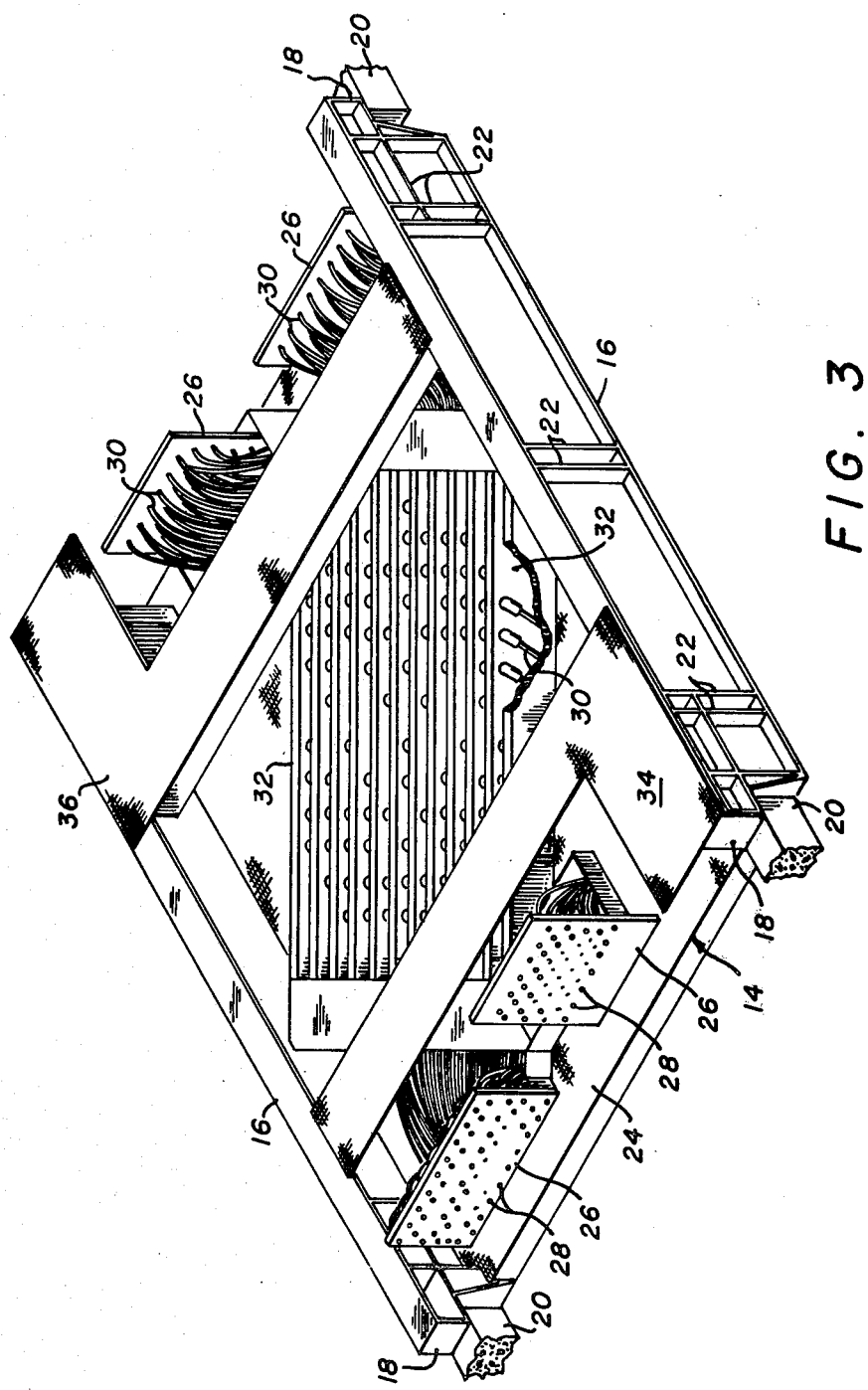
FIG. 3 is a perspective view, with some parts broken away, of the upper deck portion of another form of a HESS constructed in accordance with the present invention.

Proceeding now with a description of the nature of the construction and the mode of operation of the HESS 10, reference will be had for this purpose, particularly to FIGS. 2 and 3 of the drawing. In accord with the preferred embodiment of the invention, the HESS 10 includes a multiplicity of decks 14. The latter decks 14 are suitably disposed so as to bear a substantially horizontal orientation when the HESS 10 is positioned in supported relation above the reactor vessel 12. The number of decks 14 with which the HESS 10 is provided may vary. However, preferably in order to effect the separation and support of the electrical cabling emanating from the reactor vessel 12, the HESS 10 embodies up to four decks 14. Since all of the decks 14 are substantially similar, if not virtually identical, in construction, it is not deemed necessary for purposes of obtaining an understanding of the present invention to describe each of the decks 14 in detail herein. Rather, the discussion will be limited in this regard to a description of the lower and upper decks 14' shown in FIGS. 2 and 3, respectively, that are usable in a HESS, and which represent the best mode embodiment thereof.

With reference first to the matter of the upper deck 14', as shown in FIG. 3, the latter includes a pair of structural steel frame members 16, that extend in spaced relation to each other so as to in effect define two of the sides of the upper deck 14'. Each of the members 16 at the opposite ends thereof is provided with an overhang portion 18. The latter portions 18 are suitably configured so as to be capable of being cooperatively associated with appropriate portions of the walls 20 of the concrete structure within which, in accordance with customary practice, the reactor vessel 12 is suitably emplaced. In a manner well-known to those skilled in this art, the concrete walls 20 are located in surrounding relation to the reactor vessel 12 such that the steam generators (not shown) to which the reactor vessel 12 is operatively connected, are positioned on the other side of the walls 20. Further, the members 16 are constructed so as to be of sufficient length that they are capable of spanning the space which exists between opposing ones of the walls 20. Moreover, as best understood with reference to FIG. 3, the members 16 preferably are provided with a suitable number of reinforcing portions 22, which function to insure that the members 16 possess the strength required thereby in order to enable them to serve as support members for an entire HESS when the latter is emplaced above the reactor vessel 12.

Continuing with a description of the upper deck 14' depicted in FIG. 3, the latter further includes a floor-like surface 24 which extends between the members 16 and is suitably interconnected thereto adjacent to the bottoms thereof, as viewed with reference to FIG. 3 through the use of any suitable conventional method (not shown) of effecting the interconnection of members. The floor-like surface 24 is preferably constructed of steel plates. Further, the surface 24 has provided therein suitable openings (not shown) through which the electrical cabling that emanates from the reactor vessel 12 is routed, as will be more fully described hereinafter. A plurality of termination panels 26 are suitably supported either on the floor-like surface 24 or attached to the walls 20 such that the panels 26 define planes that extend perpendicular to the plane of the surface 24. More specifically, in accord with the illustrated embodiment of the invention, the surface 24 has at least two such termination panels 26 mounted thereon. To this end, there is one such panel 26 mounted adjacent to the edge of one of the sides of the surface 24 that extends at right angles to the members 16, while the other such panel 26 is supported in adjacent relation to the other side of the surface 24, which extends perpendicularly to the members 16. Each of the termination panels 26 has a multiplicity of openings 28 formed therein, each of which is suitably configured and dimensioned so as to be capable of receiving one end of an electrical cable 30 therewithin in supported relation thereto such that the aforesaid end of the cable 30 is accessible for interconnection with the end of another cable that is mounted in supported relation relative to a wall 20 in a manner that is yet to be described.

With further regard to the structure illustrated in FIG. 3, the surface 24 functions additionally as a support for a multiplicity of cables 30 that are routed through the openings (not shown) with which the surface 24 is suitably provided as has been described previously hereinabove. Once the cables 30 pass through the openings (not shown) they are suitably separated, i.e., segregated, and are fed to a corresponding one of the openings 28 that is provided for this purpose in a corresponding one of the termination panels 26. Thus, it can be seen from the above that the decks 14' are capable of being employed for purposes of assisting in the effectuation of the separation of the electrical cabling that emanates from the reactor vessel 12 and for purposes of providing support for the lengths of cables 30 as the latter extend across the length of the surface 24 and eventually terminate at the panels 26. The cables 30 can be alternately supported by a multiplicity of cableways 32 as shown in FIG. 3 spanning the reactor vessel and supported from the surface 24. These cableways 32 are channel-like and are mounted so as to extend on a diagonal between the members 16. The cableways 32 are suitably spaced one from another such that electrical cables 30 can be routed therebetween and into the cableways 32. The cableways 32 are structurally adequate to support the cables. Once the cables enter into the cableways 32 they are suitably separated, i.e., segregated and fed to a corresponding one of the openings 28 that is provided for this purpose in a corresponding one of the termination panels 26. Thus, it can be seen from the above that the cableways 32 are capable of being employed for purposes of assisting in the effectuation of the separation of the electrical cabling that emanates from the reactor vessel 12 and for purposes of providing support for the cables 30 as the latter extend across to the surface 24 and eventually terminate at the panels 26. In accord with the illustrated embodiment thereof shown in FIG. 3 the cableways 32 embody a configuration which resembles substantially two hollow boxes arrayed vertically. However, it is to be understood that the means of supporting the cables horizontally, i.e., on decks 14' or cableways 32 could embody some other configuration or form of construction without departing from the essence of the invention as long as the functions desired to be performed thereby, i.e., that of cable separation and support, are maintained. Lastly, suitable walk areas are provided by the surface 24 such that access can be had by personnel for purposes of effecting repairs and/or required maintenance on the equipment that is supported on the surface 24 or in sufficiently close proximity thereto so as to be reachable therefrom.

Completing the description of the upper portion of the HESS shown in FIG. 3, the latter is preferably also provided with additional sections of floor-like surfaces, i.e., those designated therein by the reference numerals 34 and 36, respectively. The surfaces 34 and 36 are each suitably dimensioned so as to extend between the members 16. Moreover, the surfaces 34 and 36 are each suitably interconnected to the members 16 through the use of any suitable conventional form of means (not shown) operable for effecting the interconnection of adjoining surfaces. The surfaces 34 and 36 are preferably constructed of steel. The surfaces 34 and 36 are intended to perform a dual function. Namely, they serve as a support surface for additional pieces of equipment, to which further reference will be had hereinafter that are required in the operation of the nuclear reactor (not shown) housed within the reactor vessel 12. To this end, the surfaces 34 and 36 are each configured so as to be capable of receiving the desired pieces of equipment thereon in supported relation thereto. The other function performed by the surfaces 34 and 36 is that of providing a walkway for purposes of enabling access to be had to pieces of equipment by personnel desirous of conducting repair and/or maintenance operations thereon. As concerns the latter function, each of the surfaces 34 and 36 is in accord with the preferred embodiment of the invention equipped with suitably placed ladders (not shown) through which access may be gained to the surfaces 34 and 36 by the aforementioned personnel. Furthermore, for purposes of insuring the safety of the personnel using the surfaces 34 and 36 as walkways, suitable guardrails (not shown) are preferably provided around the peripheries of these surfaces 34 and 36.

Turning now to a consideration of the lower deck 14' that is shown in FIG. 2 of the drawing, the latter embodies a form of construction that is similar to that of the upper deck 14' that has been described at length hereinabove. Accordingly, it is not deemed necessary for purposes of obtaining an understanding of the nature of the construction of the lower deck 14' of FIG. 2 to also describe the latter at length herein. Rather, it is deemed adequate to merely set forth below a brief descriptive summary of the nature of the construction thereof.

To this end, the lower deck 14' includes a floor-like surface 38 suitably configured and dimensioned so as to be receivable within the area defined by the walls 20. In accord with the preferred embodiment of the invention, the surface 38 is constructed of steel and in appearance resembles a grate. Suitably supported in the central portion of the surface 38 are a multiplicity of channel-like cableways, i.e., dual compartment trays, 40. The latter cableways 40 are identical in construction and in function to the cableways 32 that were described above previously in connection with the discussion of the upper deck 14'. Namely, the cableways 40, like the cableways 32, function in the manner of a separation and support means for some of the electrical cables 30. That is, the latter cables 30 are suitably routed through openings (not shown) that have been provided for this purpose in the surface 38, and thereafter are received within the appropriate cableways 40 whereupon they are made to extend the entire length thereof. In addition, the ends of the cables 30 are received in suitable openings (not shown) provided for this purpose in the termination panels 42. The latter panels 42, the number which is determined according to the need therefor, are suitably positioned in mounted relation on the surface 38 adjacent to the edge of preselected ones of the sides thereof. In accord with the best mode embodiment of the invention, there would preferably be provided four such panels 42 arranged in two sets of two each. Like the panels 26 mounted on the surface 24 of upper deck 14', the panels 42 may be mounted on the surface 38 through the use of any suitable conventional form of mounting means (not shown). Lastly, note is taken of the fact that the panels 42 and the openings (not shown) formed therein are identical to the panels 26 and the openings 28 therein, respectively, both as regards the construction thereof and the mode of operation thereof.

Like the surface 24 of the upper deck 14', the surface 38 of lower deck 14' is designed to function both in the manner of a support for equipment that it is desired to have located thereon and in the manner of a walkway whereby personnel may gain access to the equipment supported by the surface 38 or that located in sufficiently close proximity thereto so as to be accessible therefrom. To this end, surface 38 is equipped with strategically placed access ladders (not shown) whereby access may be gained to the surface 38. In addition, in accord with the preferred embodiment of the invention, the surface 38 is also equipped with suitably located guardrails (not shown) which are designed to afford protection to personnel utilizing the surface 38 as a walkway. The aforementioned ladders are guardrails with which the surface 38 is equipped have been omitted in the drawing in the interest of maintaining clarity of illustration therein, and because they are of conventional construction and are being employed in a manner well known to all.

With further reference to FIG. 2 of the drawing, there is illustrated therein the upper end of a plurality of elements, each designated by the reference numeral 44, from which emanate a plurality of individual cables 30. The elements 44 appearing in FIG. 2 are intended to depict what is known to those skilled in this art as control element drive mechanisms. Briefly stated, the latter are devices that communicate with the interior of the reactor vessel 12, and, more specifically, with the nuclear reactor (not shown) housed therein. Moreover, these devices 44 are utilized in the exercise of the controlling of the operation of the nuclear reactor (not shown). For a fuller discussion of the nature of the construction and the mode of operation of the control element drive mechanisms 44 reference may be had to the teachings of the prior art. However, for purposes of the present invention, it is sufficient to merely note that the latter mechanisms 44 function as a source of the electrical cabling, i.e., the individual electrical cables 30 to which much reference has been had hereinbefore.

Figure 4:
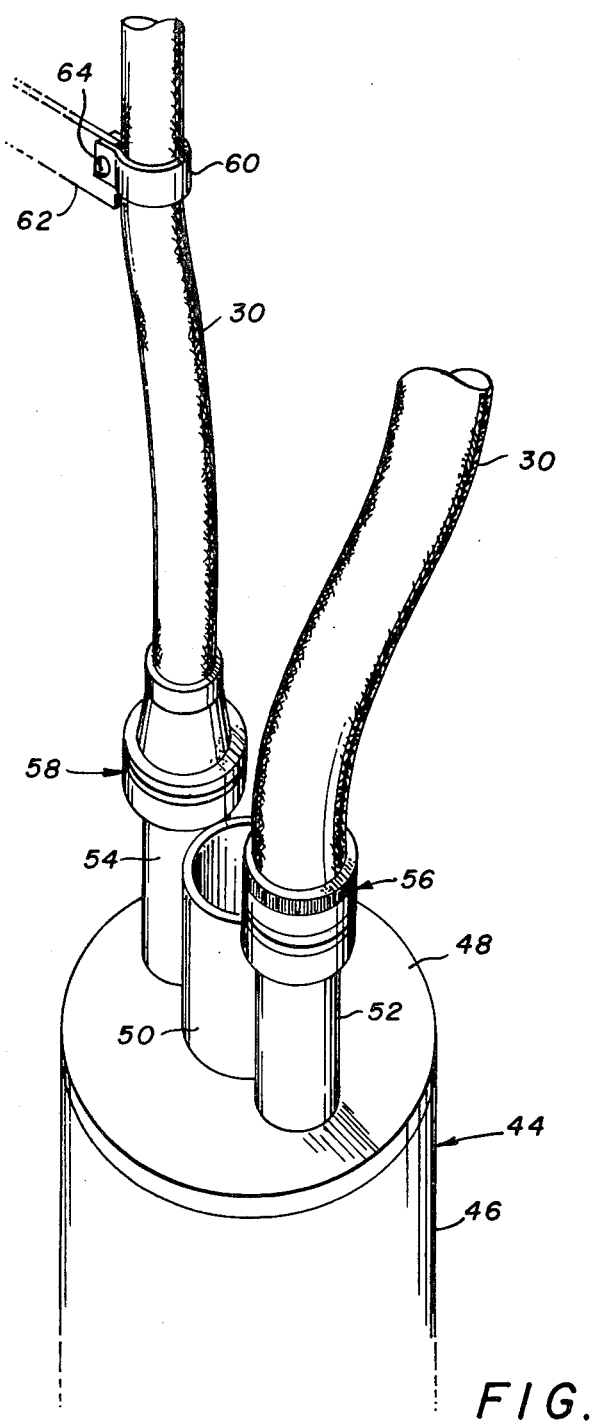
FIG. 4 is a side elevational view of a portion of the electrical cabling, the separation and support of which is effected through the use of a HESS constructed in accordance with the present invention, illustrating the manner in which the interconnection of an end thereof is accomplished.

Referring next to FIG. 4 of the drawing, there is illustrated therein on an enlarged scale the end portion of one of the control element drive mechanisms 44 that appears in FIG. 2 and to which reference has been had above. More specifically, there is depicted in FIG. 4 the upper end of a shroud 46 within which the operating components (not shown) of the control element drive mechanism 44 are encased. In accord with the preferred embodiment thereof, the shroud 46 embodies a substantially cylindrical configuration. Projecting outwardly from the end cap 48 of the shroud 46 and substantially at the center thereof is a vent 50. In addition, as shown in FIG. 4, a pair of rigid, pipe-like members 52, 54 also project outwardly of the end cap 48. In accord with the illustrated embodiment of the shroud 46, the members 52, 54 are located outwardly of and on opposite sides of the vent 50. Obviously, however, other forms of arrangements of these components could be utilized without departing from the essence of the invention. Likewise, a greater number of pipe-like members 52, 54 could be provided, if deemed desirable, without departing from the essence of the present invention.

As best understood with reference to FIG. 4 of the drawing, each of the pipe-like members 52, 54 is designed to have one end of an electrical cable 30 connected thereto. To this end, in accord with the best mode embodiment of the invention, each electrical cable 30 is preferably encased in a flexible conduit. For ease of illustration in the drawing, the reference numeral 30 has been applied to the flexible conduit within which there is located one of the electrical cables 30 that emanates from the control element drive mechanism 44. As regards more specifically the aforedescribed flexible conduit, the latter, in actuality, in accord with the best mode embodiment of the invention, consists of a flexible conduit with outer braid. For a purpose that will be discussed more fully hereinafter, it is mandatory that the flexible conduit 30 with the electrical cable located therein be capable of flexing a specified amount, i.e., be capable of moving a specified distance in a horizontal direction from a designated vertical plane. The subject flexible conduit 30 with outer braid possesses the capability of fulfilling such a requirement.

Continuing with a description of the structure depicted in FIG. 4, the end of the flexible conduit 30 which has an electrical cable encased therewithin is connected to a corresponding end of one of the pipe-like members 52, 54 through the use of a conventional form of connector 56, 58 respectively. Any suitable form of known connector means such as a threaded-type connector or a snap-lock type connector, etc., may be employed for purposes of effecting the interconnection of an end of a flexible conduit encased electrical cable 30 to the end of the pipe-like members 52, 54. It should be noted that what is important here is the concept of effectuating a rigid interconnection between the flexible conduit encased electrical cable 30 and the pipe-like members 52, 54 and not the specific connector means that is employed for this purpose. Rather, as noted above, any suitable connector means may be utilized for this purpose.

Lastly, FIG. 4 contains an illustration of one of the flexible conduit encased electrical cables 30 being clamped by means of a conventional form of clamp 60 to a support member 62 through the use of a fastener 64. The point of attachment of the clamp 60 to the flexible conduit 30 is preselected so as to insure that the latter is capable of flexing in a horizontal direction to the required degree. Namely, as will be described herein more fully subsequently, the flexible conduit 30 must be permitted to undergo a sufficient amount of flexing in the horizontal direction relative to the vertical plane defined by, and in accord with the illustration of FIG. 4, the pipe-like member 54. Thus, for this purpose, the clamp 60 must be located in suitably spaced relation to the point of connection of the end of the flexible conduit 30 to the pipe-like member 54 to enable the aforedescribed flexing to take place.

With reference again to FIG. 1 of the drawing, there is depicted therein the ductwork to which mention was made previously hereinabove. More specifically, the upper portion of the HESS 10 is intended to function as a support for an exhaust plenum 66. Moreover, in accord with the illustration of FIG. 1, the latter plenum 66 has suitably connected thereto an exhaust elbow 68, the other end of which is connectable to a suitable exhaust outlet (not shown) in a manner and for a purpose that is well-known to those skilled in this art and, accordingly, need not be described herein. In addition, a plurality of exhaust conduits 70, 72 and 74 each have one end thereof connected to the plenum 66 while the other end thereof is cooperatively associated with the reactor vessel 12 such as to comprise an exhaust circuit from the latter through the plenum 66 to the afore-referenced exhaust outlet (not shown). The aforedescribed ductwork consisting of the plenum 66, the exhaust elbow 68, and the exhaust conduit 70, 72 and 74 are suitably mounted on the HESS 10 so as to form an integral part thereof whereby when the HESS 10 is removed from its illustrated position of FIG. 1 relative to the reactor vessel 12, the aforesaid ductwork is removable therewith. Accordingly, the ends of the exhaust elbow 68 and the exhaust conduit 70, 72 and 74 that are not connected to the plenum 66 are provided with suitable disconnecting means (not shown) to enable the accomplishment of the aforementioned removal of the HESS 10 from the position occupied thereby in FIG. 1.

Completing the description of the HESS 10, as best understood with reference to FIG. 1 of the drawing, the HESS 10, in accord with the best mode embodiment of the invention, is provided with a vertically extending leg-like column 76 located at each of the four corners thereof, only three such columns 76 being visible in FIG. 1. The columns 76 are rigidly affixed to one or more of the decks 14 so as to extend substantially perpendicular thereto, through the use of any suitable conventional form of fastening means (not shown). The principal function of the columns 76 is to serve as support legs for the HESS 10 when the latter occupies its laydown position; namely, when the HESS 10 is removed from emplacement above the reactor vessel 12, i.e., removed from the position thereof depicted in FIG. 1.

A description will now be had of the mode of operation of the HESS 10. Normally, the latter will be found emplaced above the reactor vessel 12 in the manner depicted in FIG. 1. When so positioned, the HESS 10 is suitably supported by virtue of the engagement of the overhang portions 18 of the frame member 16 with appropriate portions of the walls 20. As such, the multiple decks 14 of the HESS 10 lie within the area defined within the walls 20. However, if it is deemed desirable, provision could be made to have portions of others of the decks 14 engage support members provided for this purpose at intermediate locations along the length of the walls 20. Two such portions identified through the use of the reference numeral 78 have been shown in FIG. 2 by way of exemplification.

With further regard to the mode of operation of the HESS 10, the electrical cables 30 emanating from the control element drive mechanisms 44 are suitably routed through the openings (not shown) that are formed for this purpose in the various floor-like surfaces, e.g., 24, 38, etc., with which each of the multiple decks 14' are provided. To this end, the electrical cables 30 upon leaving the mechanisms 44 are suitably separated such as to be routed to the appropriate one of the multiple decks 14'. In this regard, the separation of the electrical cables is accomplished so as to insure that the desired isolation between primary cables and the cables that function as backup thereto is achieved. By way of illustration in this regard, there are various types of cables that extend from the mechanisms 44. Namely, there is power cabling, reed switch position transmitter cabling and in-core instrumentation cabling. Moreover, the reed switch position transmitter cabling encompasses two sets of such cabling between which it is desired to effect isolation. In accord with the best mode embodiment of the invention, each of these various types of cables is routed in a preselected manner to effect the desired separation and/or isolation therebetween. In this connection, not only are the cables 30 sorted for routing to individual ones of the decks 14', but they also are sorted so as to be receivable within a given one of the cableways 32 or 40 such that they can be fed properly to the appropriate opening in the proper termination panels 26 or 42. To summarize, the separation of the electrical cables 30 is achieved by the routing thereof to the appropriate location, i.e., to the proper deck 14', the proper cableway 32 or 40 and the proper opening in the proper termination panel 26 or 42.

Continuing with the description of the mode of operation of the HESS 10, once the electrical cables 30 have been routed therethrough in the manner described above, should there be a need to effect repairs therein necessitating the removal of one or more cables 30 therefrom, this task can be easily accomplished. Namely, with the HESS 10 emplaced above the reactor vessel 12 in the manner depicted in FIG. 1, the removal of a cable 30 from the HESS 10 can be accomplished simply by disconnecting both ends of the appropriate cable 30 and disconnecting the clamp 60 if such should be employed, while thereafter effecting the withdrawal of the latter cable 30 from the appropriate deck 14', and termination panel 26 or 42. Similarly, utilizing the floor-like surfaces of the decks 14' as walkways, personnel may effect the afore-described withdrawal of the cable 30 as well as accomplish repairs and/or normal maintenance on any of the pieces of equipment accessible therefrom.

In accord with the best mode embodiment of the invention, the ends of the cables 30 that are supported in the termination panels such as the panels 26 and 42, are designed to be connected to the ends of other cables, such as those designated by reference numeral 80 in FIG. 2, that are supported by the walls 20. Moreover, the connection of the ends of the cables 30 with the ends of the cables 80 preferably is effected through the use of suitable means (not shown) similar to the connector means 56, 58 depicted in FIG. 4. Finally, for purposes of spanning the gaps that exist between the edges of the decks 14 and the walls 20, suitable tray-like members may be provided. Preferably, such tray-like members would extend between the edges of the decks 14' and the walls 20 and would provide a planar support for the electrical cabling extending therebetween. In order to facilitate the removal of the HESS 10 from the position occupied thereby in FIG. 1, such tray-like members preferably would either take the form of a tray that is pivotably affixed to the HESS 10 so as to be pivotable relative thereto between an extended and a retracted position, or such tray-like members would take the form of a tray which is retractably mounted on the walls 20 so as to be movable relative thereto between an extended and a retracted position.

Referring again to the matter of the clamp 60 depicted in FIG. 4, the need to allow for movement by the electrical cables 30 stems from the fact that allowance must be made for the possibility that seismic occurrences may taken place that will affect the HESS 10; namely, that will cause the latter, and, more particularly, the components encompassed thereby to move. To this end, this is the reason why flexible conduit has been proposed for use in the HESS 10. Other means such as telescoping conduits, etc., had been proposed for use, but generally have been found to be unacceptable from the standpoint of their ability to fulfill the requirement that allowance be made for movement of the cables 30 occasioned by the occurrences of seismic events.

The fact that the HESS 10 additionally is operative as a support for auxiliary-type equipment such as the ductwork encompassing the plenum 66, elbow 68 and conduit 70, 72 and 74 shown in FIG. 1 has been discussed above in detail, and accordingly, it is not deemed necessary to make further reference thereto at this point. However, mention was made above to the fact that the HESS 10 is operative in the manner of a missile shield. To this end, the multiple decks 14 are operative to absorb the kinetic energy possessed by missiles striking thereagainst as the latter are propelled away from the reactor vessel 12. Moreover, suitable steel plates may be mounted in supported relation to the upper deck 14 as a further barrier to such missiles. These steel plates would be designed to form an integral part of the HESS 10 so as to be movable as unit therewith. In summary, the decks 14 and the aforesaid steel plates are capable of providing a missile shield that is functionally as effective as the concrete missile shield that has commonly been employed heretofore. However, the former possesses a major advantage over the latter, both in terms of the ease of removal thereof as well as in the time and cost involved in effecting the placement thereof. A discussion has been had previously hereinabove of the importance of such factors.

Finally, in the event that it becomes necessary to remove the HESS 10 from the position thereof shown in FIG. 1 relative to the reactor vessel 12, i.e., move the HESS 10 to a laydown position, this is easily accomplished. Namely, in accord with the best mode embodiment of the invention, the HESS 10 is preferably provided with a plurality of strategically located lifting lugs (not shown). Through the engagement of the latter lugs (not shown) by suitable lifting means, the entire HESS 10 may be raised from engagement with the walls 20, and moved to another position, i.e., a laydown position, whereby unobstructed access may be had to the reactor vessel 12. Obviously, before the HESS 10 would be raised, as described above, the cables 30 and the conduits 70, 72 and 74 as well as any other elements that may require such action would be suitably disconnected. When moved to its laydown position, the HESS 10 is made to rest on the four columns 76.

Thus, in accordance with the present invention, there has been provided a new and improved form of support structure system that is particularly suited for use in cooperative relation with a reactor vessel in a nuclear power generation system for purposes of providing support for the head equipment associated therewith. Moreover, the subject head equipment support structure system is operable in the manner of a cable support structure. In addition, in accord with the present invention, a head equipment support structure system is provided that in addition is operable in the manner of a missile shield. Further, the head equipment support structure system is also operable in the manner of a ductwork support structure. Additionally, in accordance with the present invention, a head equipment support structure system is provided that is characterized in the ease with which it may be repositioned for purposes of effecting the removal of the head of the reactor vessel. Also, the head equipment support structure system of the present invention is characterized in the fact that it is equally applicable for use in new installations as well as retrofit applications. Furthermore, in accord with the present invention, a head equipment support structure system that renders it possible through the use thereof to attain measurable cost-savings and time-savings as compared to the costs and times associated with the use of prior art forms of support structure systems.

While one one embodiment of our invention has been shown it will be appreciated that modifications thereof, some of which have been alluded to hereinabove, may still be readily made thereto by those skilled in the art. We, therefore, intend by the appended claims to cover the modifications alluded to herein as well as all other modifications, which fall within the true spirit and scope of our invention.

We claim:

1. A support structure system adapted for use in cooperative association with a nuclear reactor vessel comprising:
   a. mounting means operative for selectively mounting the support structure system in either one of a first and second positions relative to the nuclear reactor vessel;

b. multiple deck means arranged in a tiered array, said multiple deck means being interconnected one with another to form an integral structure;

c. a multiplicity of cables routed through said multiple deck means, said multiplicity of cables each having one end thereof extending in a first direction and having the other end thereof extending in a second direction oriented substantially perpendicular to said first direction;

d. connector means operative for cooperatively associating said one end of each of said multiplicity of cables with the nuclear reactor vessel;

e. first support means operative for purposes of providing a separation between individual ones of said multiplicity of cables, said first support means further being operative to provide support to said multiplicity of cables intermediate the length thereof; and f. a second support means operative for supporting said other end of each of said multiplicity of cables.

2. The support structure system as set forth in claim 1 wherein said mounting means includes a first mounting means operative for mounting the support structure system above and in spaced relation to the nuclear reactor vessel.

3. The support structure system as set forth in claim 2 wherein said mounting means further includes a second mounting means operative for mounting the support structure system in a laydown position relative to the nuclear reactor vessel.

4. The support structure system as set forth in claim 1 wherein each of said multiple deck means includes at least one floor-like surface lying in a substantially horizontal plane, and having openings formed therein for routing said multiplicity of cables therethrough.

5. The support structure system as set forth in claim 4 wherein said first support means comprises a multiplicity of channel-like cableways mounted in supported relation on each of said floor-like surfaces of said multiple deck means so as to occupy substantially the entire central portion thereof, said multiplicity of channel-like cableways being operative to receive therewithin said multiplicity of cables.

6. The support structure system as set forth in claim 5 wherein said second support means comprises a plurality of termination panels mounted on said floor-like surfaces adjacent the edges thereof and so as to extend substantially perpendicular thereto.

7. The support structure system as set forth in claim 1 wherein said connector means comprises a connector operative for connecting said one end of each of said multiplicity of cables to the nuclear reactor vessel.

8. The support structure system as set forth in claim 7 further including clamping means operative for clamping said multiplicity of cables in spaced relation to said one end thereof so as to permit said one end of said multiplicity of cables to move laterally in response to the existence of a seismic occurrence.

9. The support structure system as set forth in claim 1 wherein said multiple deck means are operative in the manner of a missile shield to absorb the kinetic energy of missiles striking thereagainst.

10. The support structure system as set forth in claim 1 wherein at least one of said multiple deck means is operative as a support for ductwork.

* * * * *